United States Patent
Pollett et al.

(10) Patent No.: US 6,599,657 B1
(45) Date of Patent: Jul. 29, 2003

(54) BATTERY PACK HOUSING AND BATTERY PACK AND POWER SUPPLY DEVICE INCORPORATING THE SAME

(75) Inventors: Woodrow Pollett, San Diego, CA (US); Paul Bruce, San Diego, CA (US); William Bajis, San Diego, CA (US)

(73) Assignee: Powerware Corporation, Raleigh, NC (US)

( * ) Notice: Subject to any disclaimer, the term of this patent is extended or adjusted under 35 U.S.C. 154(b) by 23 days.

(21) Appl. No.: 09/708,741

(22) Filed: Nov. 8, 2000

(51) Int. Cl.[7] .............................. H01M 2/10; H01M 2/26
(52) U.S. Cl. ......................... 429/96; 429/99; 429/159; 429/187; 29/623.1
(58) Field of Search ...................... 429/82, 96, 99, 429/100, 159, 187; 29/623.1

(56) References Cited

U.S. PATENT DOCUMENTS

| | | | | |
|---|---|---|---|---|
| 3,661,649 A | * | 5/1972 | Kaye | 429/159 X |
| 5,075,182 A | * | 12/1991 | Weber | 429/187 X |
| 5,288,565 A | * | 2/1994 | Gruenstern | 429/159 X |
| 5,294,497 A | * | 3/1994 | Muramatsu et al. | 429/97 |
| 5,422,200 A | * | 6/1995 | Hope et al. | 429/159 X |
| 5,466,545 A | * | 11/1995 | Chamberlain et al. | 429/99 |
| 5,534,366 A | * | 7/1996 | Hwang et al. | 429/99 X |
| 5,864,462 A | * | 1/1999 | Kao | 429/100 X |
| 5,962,159 A | * | 10/1999 | Satou et al. | 429/99 |

* cited by examiner

Primary Examiner—Stephen Kalafut
(74) Attorney, Agent, or Firm—Myers Bigel Sibley & Sajovec (57) ABSTRACT

A battery pack includes a housing having first and second shell portions. The first shell portion includes a first base wall and a plurality of upstanding first side walls extending from the first base wall. The first base wall and the first side walls define a first cavity. The second shell portion is foldably connected to the first shell portion. The second shell portion includes a second base wall and a plurality of upstanding second side walls extending from the second base wall. The second base wall and the second side walls define a second cavity. The first shell portion and the second shell portion are formed of a polymeric material. At least one battery is disposed in the first and second cavities. At least one wire is operatively connected to the battery.

33 Claims, 12 Drawing Sheets

BATTERY PACK HOUSING AND BATTERY PACK AND POWER SUPPLY DEVICE INCORPORATING THE SAME

FIELD OF THE INVENTION

The present invention relates to batteries, and, more particularly, to a battery pack housing and a battery pack and power supply device incorporating the same.

BACKGROUND OF THE INVENTION

Power supply and management devices such as uninterruptible power systems (UPSs) and extended battery modules (EBMs) commonly include a removable battery pack to supply back up power for an associated device (e.g., a computer). The battery pack may include a plurality of individual batteries (e.g., lead/acid batteries) disposed in a surrounding housing.

SUMMARY OF THE INVENTION

According to embodiments of the invention, a battery pack includes a housing having first and second shell portions. The first shell portion includes a first base wall and a plurality of upstanding first side walls extending from the first base wall. The first base wall and the first side walls define a first cavity. The second shell portion is foldably connected to the first shell portion. The second shell portion includes a second base wall and a plurality of upstanding second side walls extending from the second base wall. The second base wall and the second side walls define a second cavity. The first shell portion and the second shell portion are formed of a polymeric material. At least one battery is disposed in the first and second cavities. At least one wire is operatively connected to the battery.

According to embodiments of the invention, a housing for a battery pack includes first and second shell portions and a hinge wall. The first shell portion includes a first base wall and a plurality of upstanding first side walls extending from the first base wall. The first base wall and the first side walls define a first cavity. The second shell portion includes a second base wall and a plurality of upstanding second side walls extending from the second base wall. The second base wall and the second side walls define a second cavity. The hinge wall has first and second opposed edges adjoining the first and second shell portions, respectively. The first shell portion, the second shell portion and the hinge wall are formed of a polymeric material.

According to further embodiments of the invention, a housing for a battery pack includes first and second shell portions. The first shell portion includes a first base wall and a plurality of upstanding first side walls extending from the first base wall. The first base wall and the first side walls define a first cavity. The second shell portion is foldably connected to the first shell portion. The second shell portion includes a second base wall and a plurality of upstanding second side walls extending from the second base wall. The second base wall and the second side walls define a second cavity. A wire channel is formed in at least one of the first and second shell portions. The wire channel is sized and configured to receive at least one wire.

According to further embodiments of the invention, a power supply device includes a device case. A power supply circuit is mounted in the device case. A battery pack is mounted in the device case. The battery pack includes a housing having first and second shell portions. The first shell portion includes a first base wall and a plurality of upstanding first side walls extending from the first base wall. The first base wall and the first side walls define a first cavity. The second shell portion is foldably connected to the first shell portion. The second shell portion includes a second base wall and a plurality of upstanding second side walls extending from the second base wall. The second base wall and the second side walls define a second cavity. The first shell portion and the second shell portion are formed of a polymeric material. At least one battery is disposed in the first and second cavities. At least one wire operatively connects the battery to the power supply circuit.

According to preferred method embodiments of the invention, a method for forming a battery pack includes providing a continuous sheet of polymeric material. A unitary housing is thermoformed in the sheet. The housing includes first and second shell portions. The first shell portion includes a first base wall and a plurality of upstanding first side walls extending from the first base wall. The first base wall and the first side walls define a first cavity. A second shell portion is foldably connected to the first shell portion. The second shell portion includes a second base wall and a plurality of upstanding second side walls extending from the second base wall. The second base wall and the second side walls define a second cavity. The housing is removed from a remaining portion of the sheet. A plurality of batteries are placed in the first cavity. The plurality of batteries are electrically connected with at least one wire. The second shell portion is folded about the first shell portion such that the battery is received in the second cavity.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The thicknesses of some elements may be exaggerated for clarity.

Figure 1:
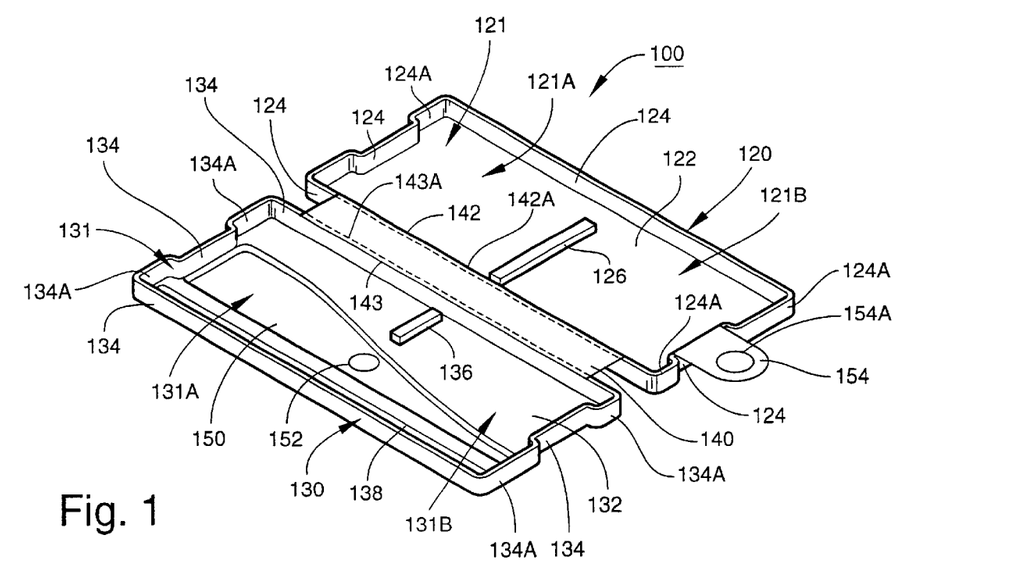
FIG. 1 is a front perspective view of a battery pack housing according to preferred embodiments of the present invention.
Figure 2:
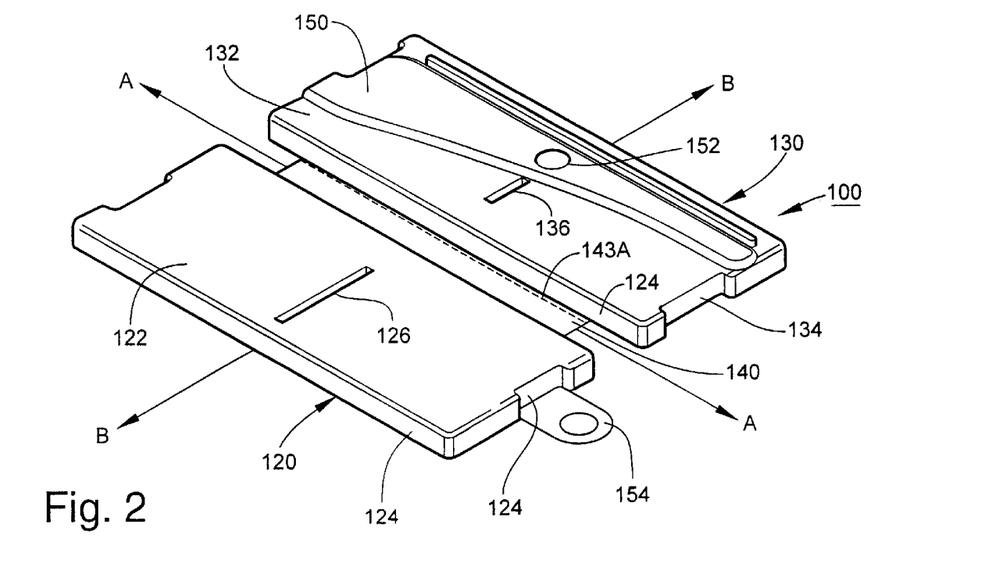
FIG. 2 is a rear perspective view of the battery pack housing of FIG. 1.
Figure 3:
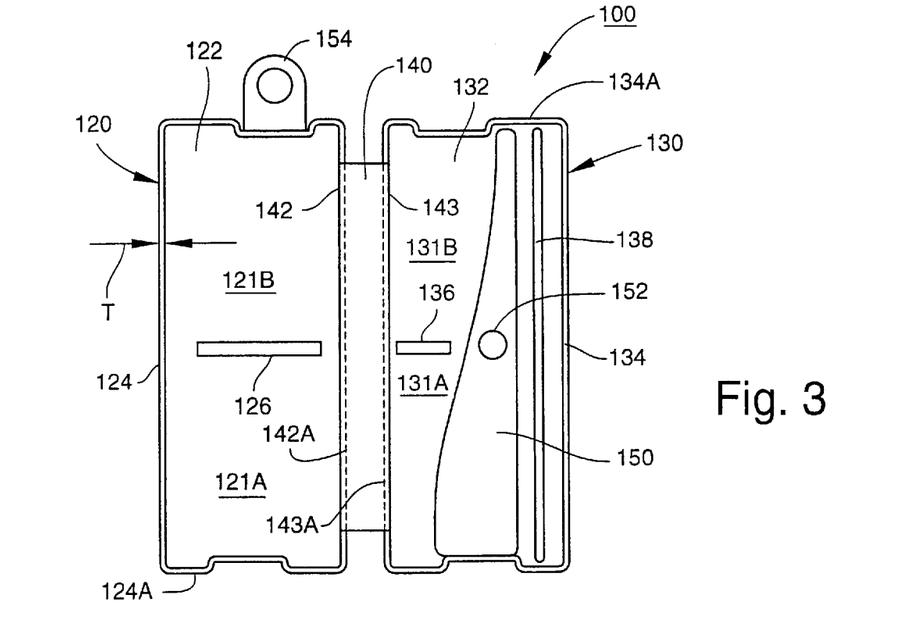
FIG. 3 is a front elevational view of the battery pack housing of FIG. 1.
Figure 8:
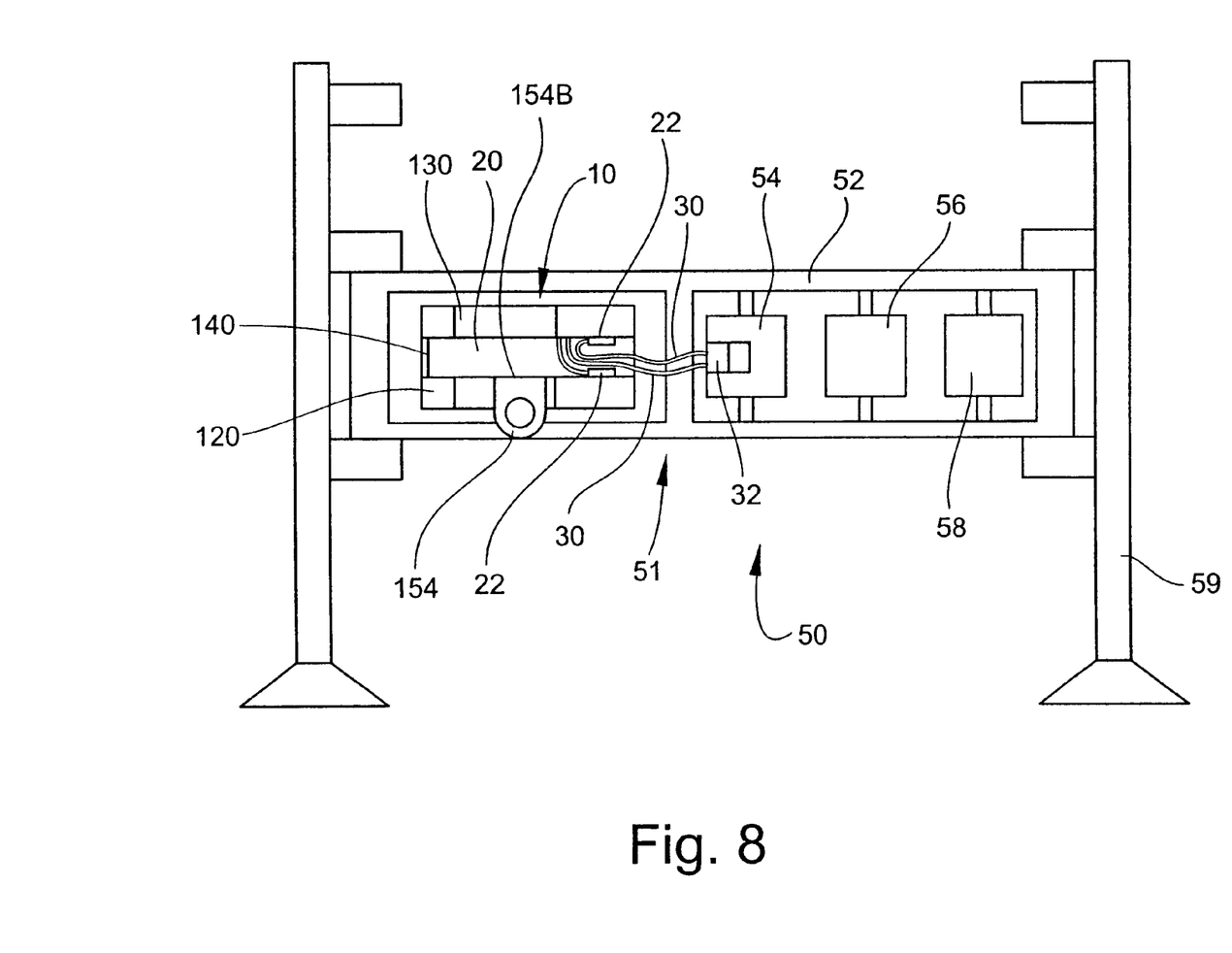
FIG. 8 is a schematic view of a power supply device incorporating the battery pack of FIG. 5.
Figure 9:
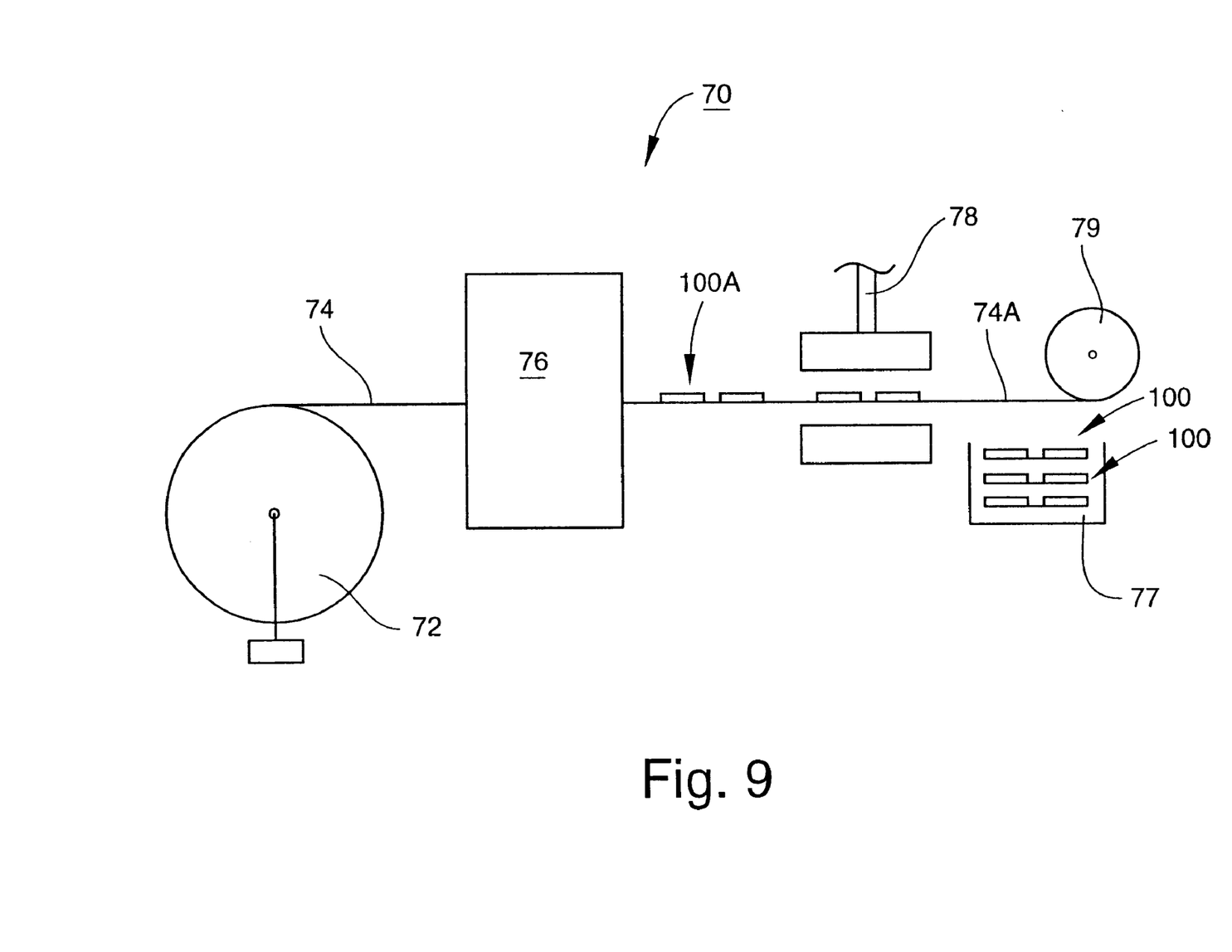
FIG. 9 is a schematic view of an apparatus for forming the battery pack housing of FIG. 1.

With reference to the figures, a battery pack housing 100 according to preferred embodiments of the invention is shown in FIGS. 1–3. The housing 100 may be used to form a battery pack 10 according to preferred embodiments as shown in FIGS. 5, 6 and 7A–7F. The battery pack 10 may be incorporated into a battery subsystem 51 (which may in turn form a part of a power supply device 50 such as a UPS or EBM) as shown in FIG. 8. The battery pack housing 100 may be formed using methods according to the invention. Certain preferred apparatus 70 for executing preferred methods of the invention are shown in FIG. 9.

Turning to the battery pack housing 100 in more detail, the housing 100 is preferably unitarily formed from an integral layer of material. More preferably, the housing 100 is formed of a polymeric material. Preferably, the polymeric material is transparent or translucent and impervious to sulfuric acid. Most preferably, the polymeric material is substantially transparent and formed of a polyester-based plastic. Preferably, the housing 100 has a substantially uniform thickness T (see FIG. 3). Preferably, the thickness T is between about 1.22 and 1.32 mm. The preferred construction of the housing 100 will be better appreciated from the description of the method for forming as set forth below.

The housing 100 includes a lower shell portion 120, an upper shell portion 130 and a hinge wall 140. The housing 100 has a lengthwise axis A—A and a transverse axis B—B.

The lower shell portion 120 includes a base wall 122 and surrounding upstanding side walls 124. The side walls 124 include extended corners 124A. The walls 122, 124 define a cavity 121. An upstanding rib 126 extends into the cavity 121 and substantially parallel to the axis B—B. The rib 126 divides the cavity 121 into adjacent trays 121A and 121B. A tab or handle 154 having an opening 154A extends from a side wall 124.

The upper shell portion 130 includes a base wall 132 and surrounding upstanding side walls 134. The side walls 134 include extended corners 134A. The walls 132, 134 define a cavity 131. An upstanding rib 136 extends into the cavity 131 and substantially parallel to the axis B—B. The rib 136 divides the cavity 131 into adjacent trays 131A and 131B. A support channel 138 and a wire channel 150 extend rearwardly from the cavity 131 and generally along the axis A—A. The support channel 138 and the wire channel 150 each communicate with the cavity 131. A vent hole 152 extends fully through the base wall 132.

The shell portions 120 and 130 are joined to one another by the hinge wall 140 along a fold line 142 and a fold line 143, respectively. The fold lines 142, 143 extend substantially parallel to the axis A—A. Perforations 142A and 143A are formed in the hinge wall 140 along the fold lines 142 and 143, respectively. With this construction, the fold lines 142, 143 may serve as living hinges.

In FIGS. 1–3, the housing 100 is shown in an extended or storing position. When manufactured according to the preferred methods, the housing 100 is initially disposed in the storing position until subsequently folded as described below. Notably, the housing 100 is configured such that a plurality of the housings 100 may be closely stacked in a nested fashion. In this manner, the housings 100 may be stored and shipped using a relatively small area and volume.

Figure 4:
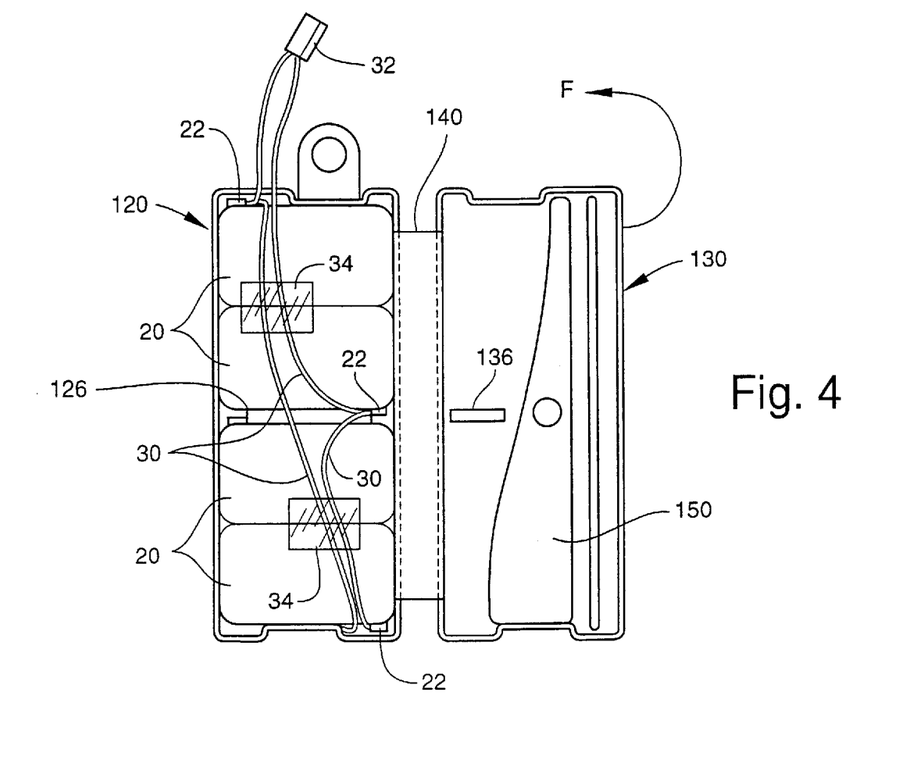
FIG. 4 is a front elevational view of the battery pack housing of FIG. 1 with batteries and wires installed therein.

The battery pack 10 may be assembled in the following manner. The housing 100 is first provided in the extended position as shown in FIG. 3. A plurality of batteries 20 are then installed in the housing 100. The batteries 20 may be, for example, lead/acid batteries. The batteries 20 may include suitable indicia 24 such as warnings, manufacturer identification, instructions and/or specifications on the outer casings thereof. The batteries 20 preferably have positive and negative terminals 22 on a common side of each battery 20. The batteries 20 are installed by laying the batteries 20 side by side into the cavity 121 of the shell portion 120. More particularly and as shown in FIG. 4, two of the batteries 20 are placed in the tray 121A (FIG. 1) and two of the batteries 20 are placed in the tray 121B. The batteries 20 of each pair are oppositely oriented such that the terminals 22 of the end batteries 20 face outwardly and are received in the extended corners 124A, 134A, and the terminals 22 of the interior batteries 20 face inwardly (i.e., toward one another) and are received in a gap maintained by the rib 126.

Prior to, following or during the step of placing the batteries 20 in the shell portion 120, a series of wires 30 are connected to the terminals 22 of the respective batteries 20 such that the batteries 20 are electrically wired in series. The wires 30 are preferably insulated cables. The wires 30 are routed as shown in FIG. 4 and may optionally be secured in place by strips of self-adhesive tape 34. The wires 30 terminate in an associated connector 32.

After the batteries 20 and the wires 30 are installed as described above, the shell portion 130 is folded about the shell portion 120 in a direction F (FIG. 4). More particularly, the hinge wall 140 is folded about the fold line 142 and the shell portion 130 is folded about the fold line 143 such that the shell portion 130 is placed over the batteries 20 and the wires 30. In this manner, portions of the batteries 20 are received in the cavity 131 and the rib 136 is inserted between the interior batteries 20. More particularly, a first pair of the batteries 20 is received in the tray 131A and a second pair of the batteries 20 is received in the tray 131B. The wires 30 are received in the wire channel 150. Preferably, the wire channel 150 is dimensioned and configured relative to the wires 30 such that the thicknesses of the wires 30 do not cause the base wall 132 to bulge when the shell portion 130 is seated over the batteries 20 and the wires 30.

The batteries 20 and the shell portions 120, 130 are relatively dimensioned and configured such that the shell portions 120, 130 do not fully surround the batteries 20. Rather, the shell portions 120, 130 define a lengthwise and widthwise gap G. The gap G extends fully about the central periphery of the battery pack 10 except in the area of the hinge wall 140 which connects and spaces apart the shell portions 120, 130.

Figure 5:
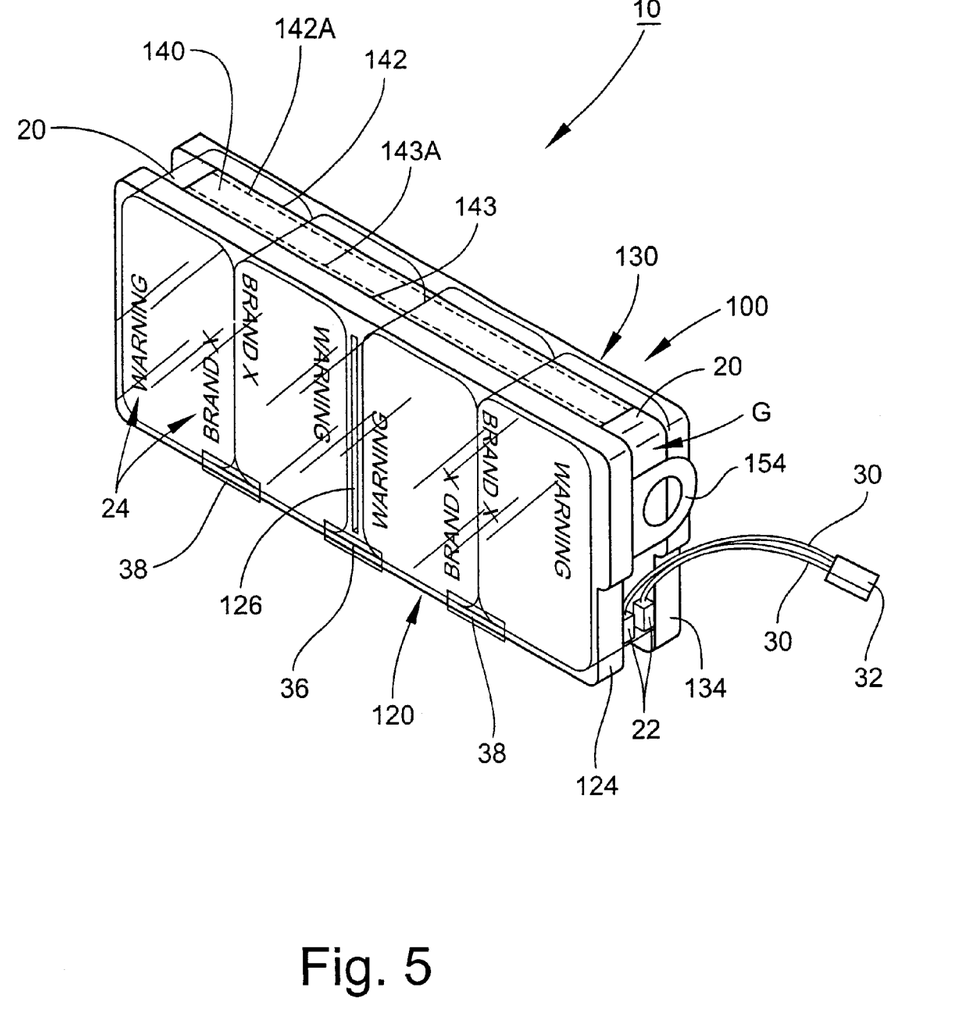
FIG. 5 is a perspective view of a battery pack incorporating the battery pack housing of FIG. 1 and viewed from a first direction.
Figure 6:
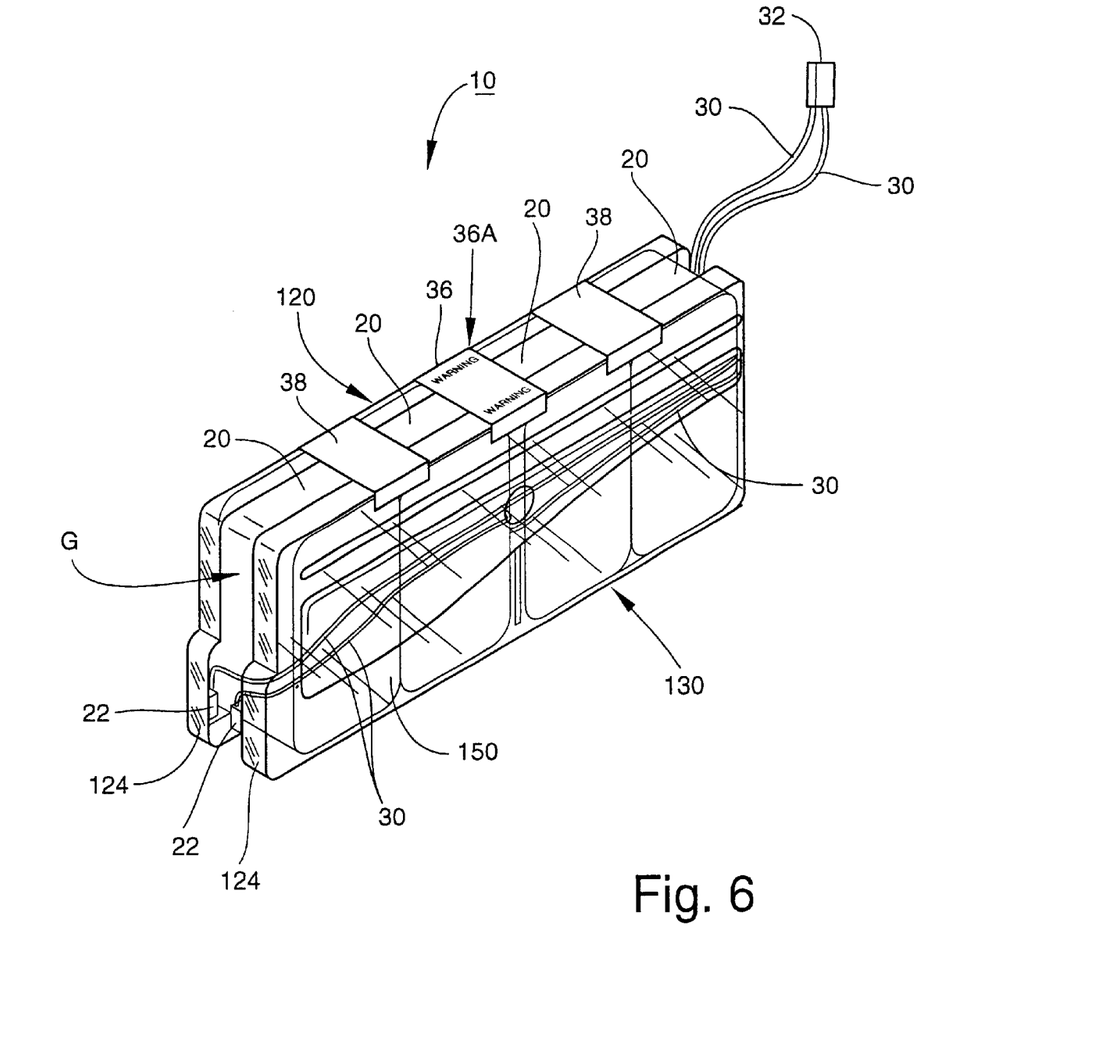
FIG. 6 is a perspective view of the battery pack of FIG. 5 as viewed from a second direction.
Figure 7A:
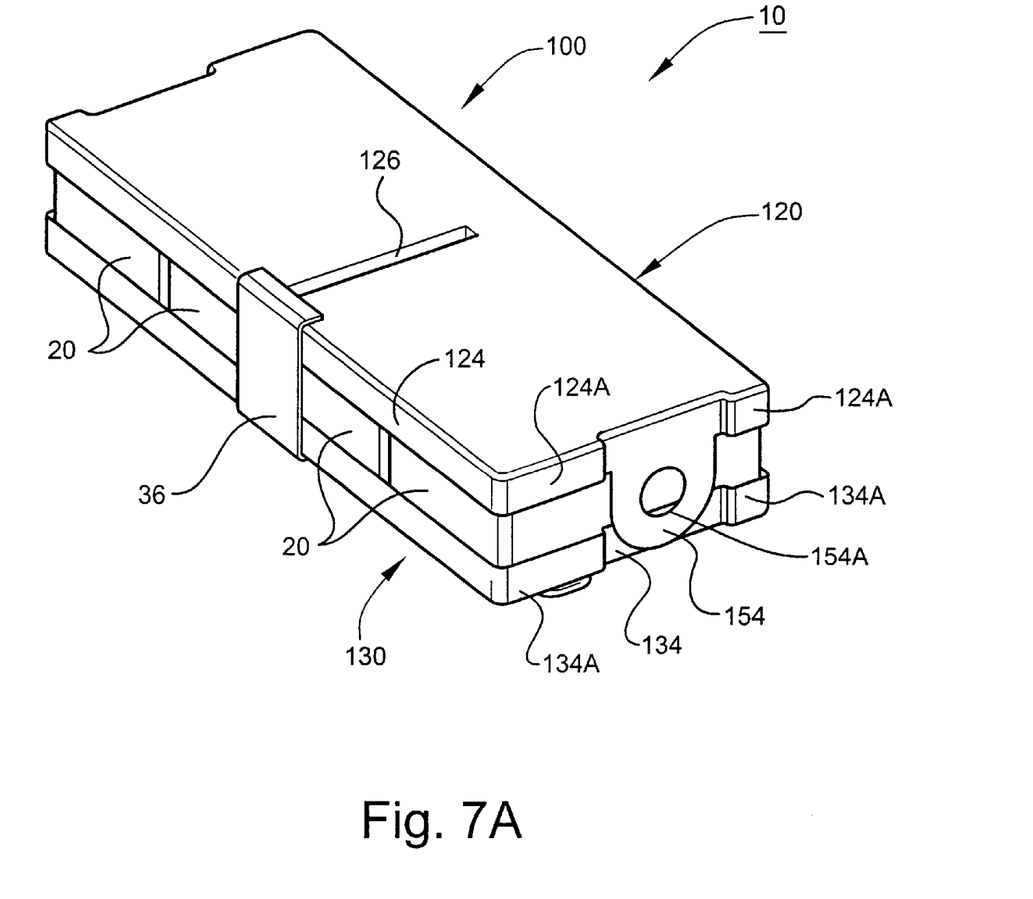
FIGS. 7A–7F are perspective views of the battery pack of FIG. 5 as viewed from different directions, wherein the transparency of the battery pack housing, selected features of the batteries, the self-adhesive tape strips, the warning indicia, and the wires are omitted from the views for clarity in illustrating the shape of the battery pack housing relative to the batteries.
Figure 7B:
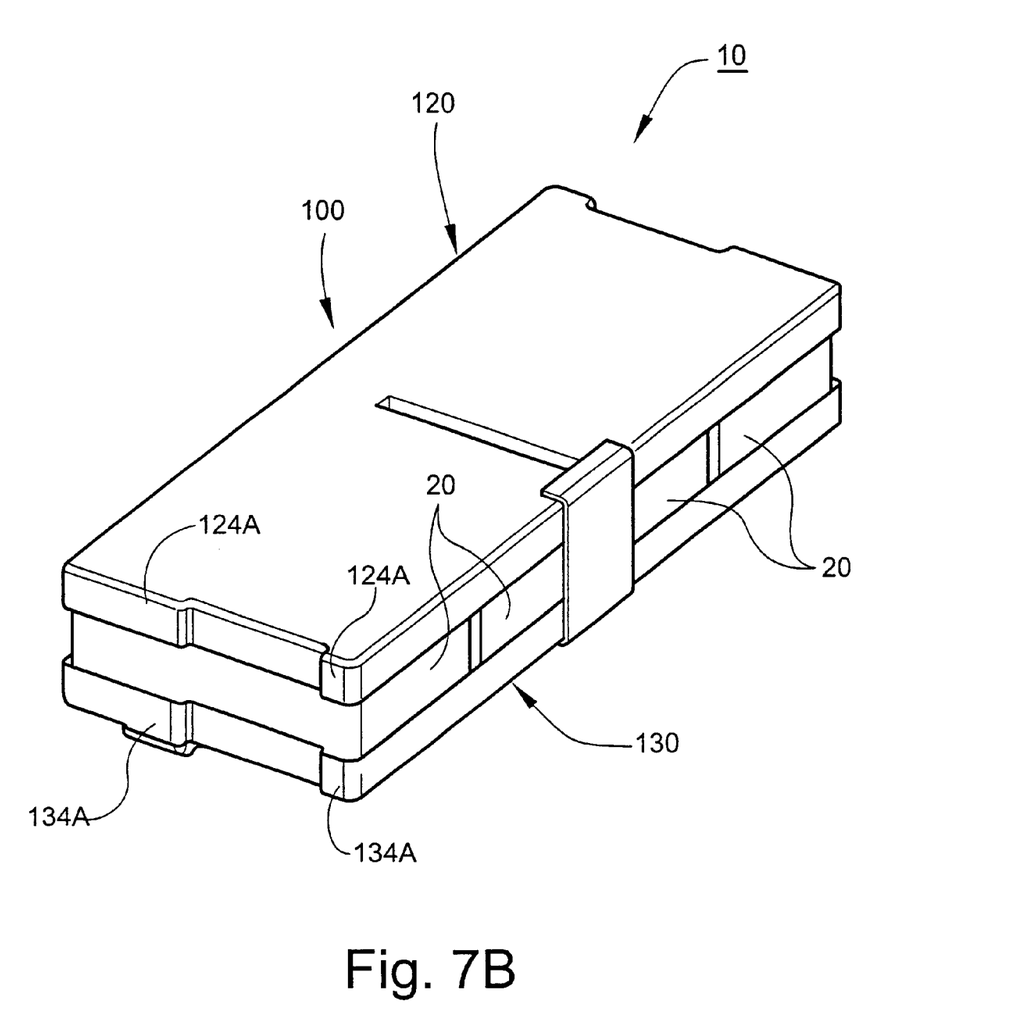
Figure 7C:
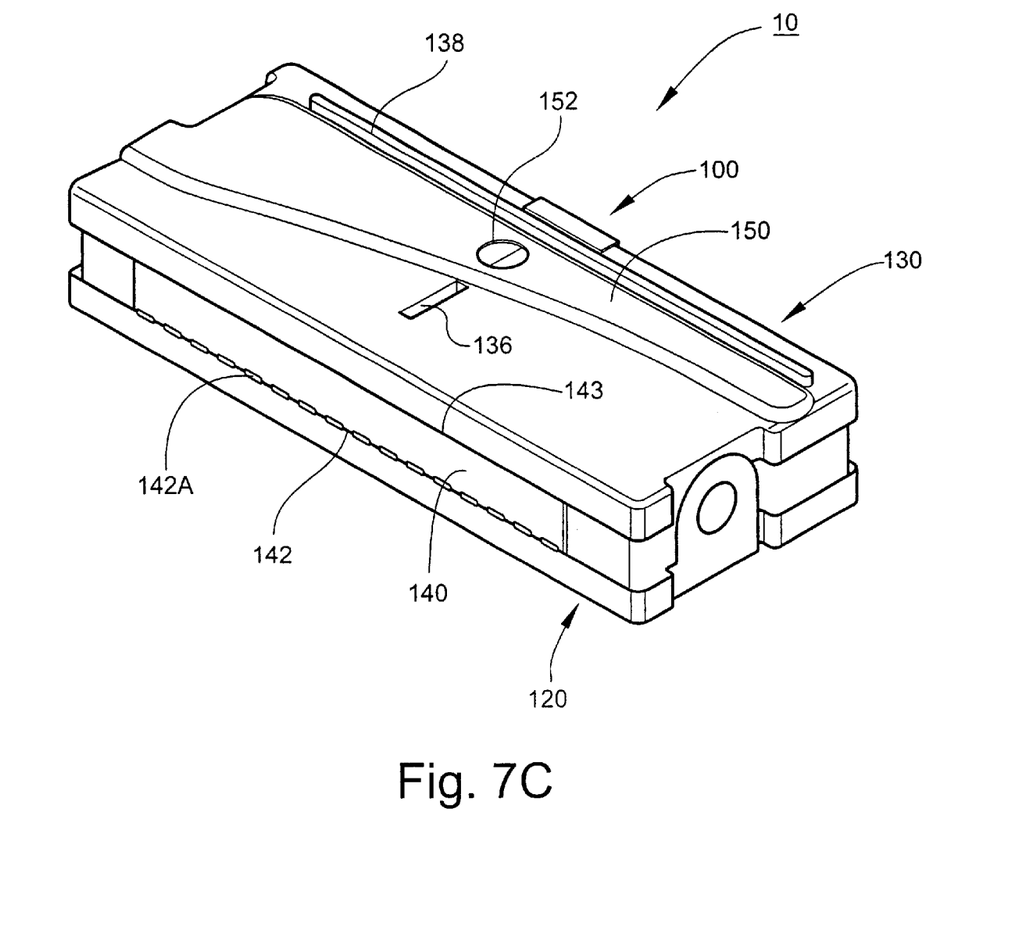
Figure 7D:
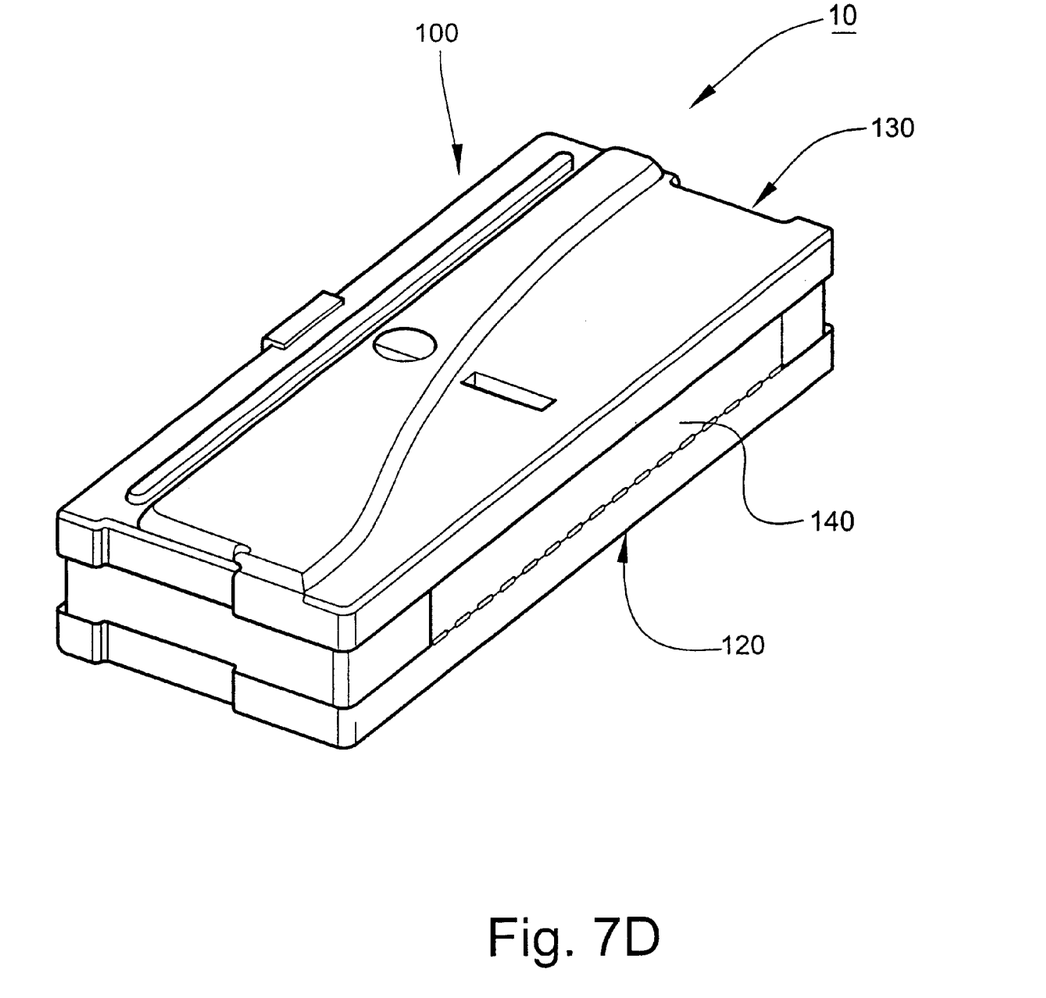
Figure 7E:
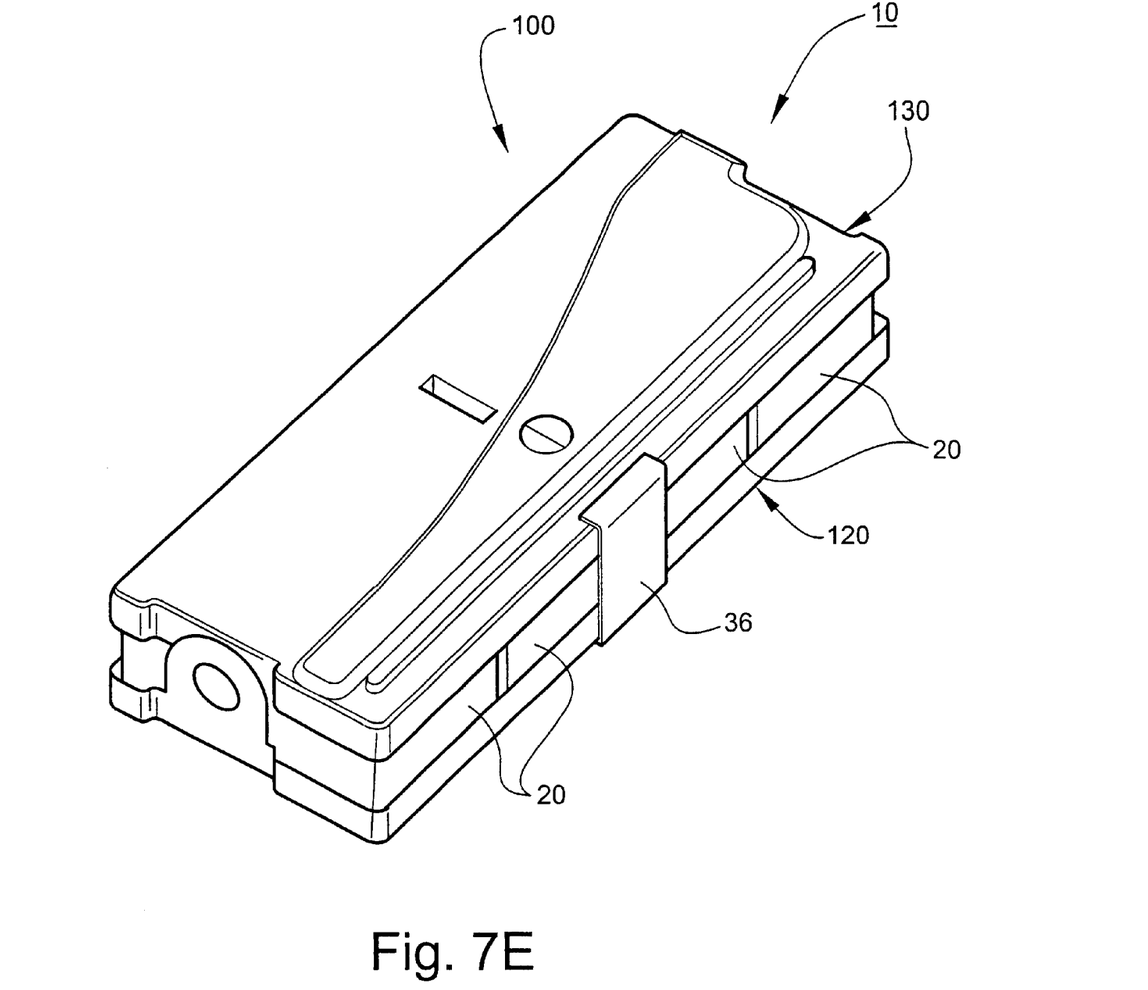
Figure 7F:
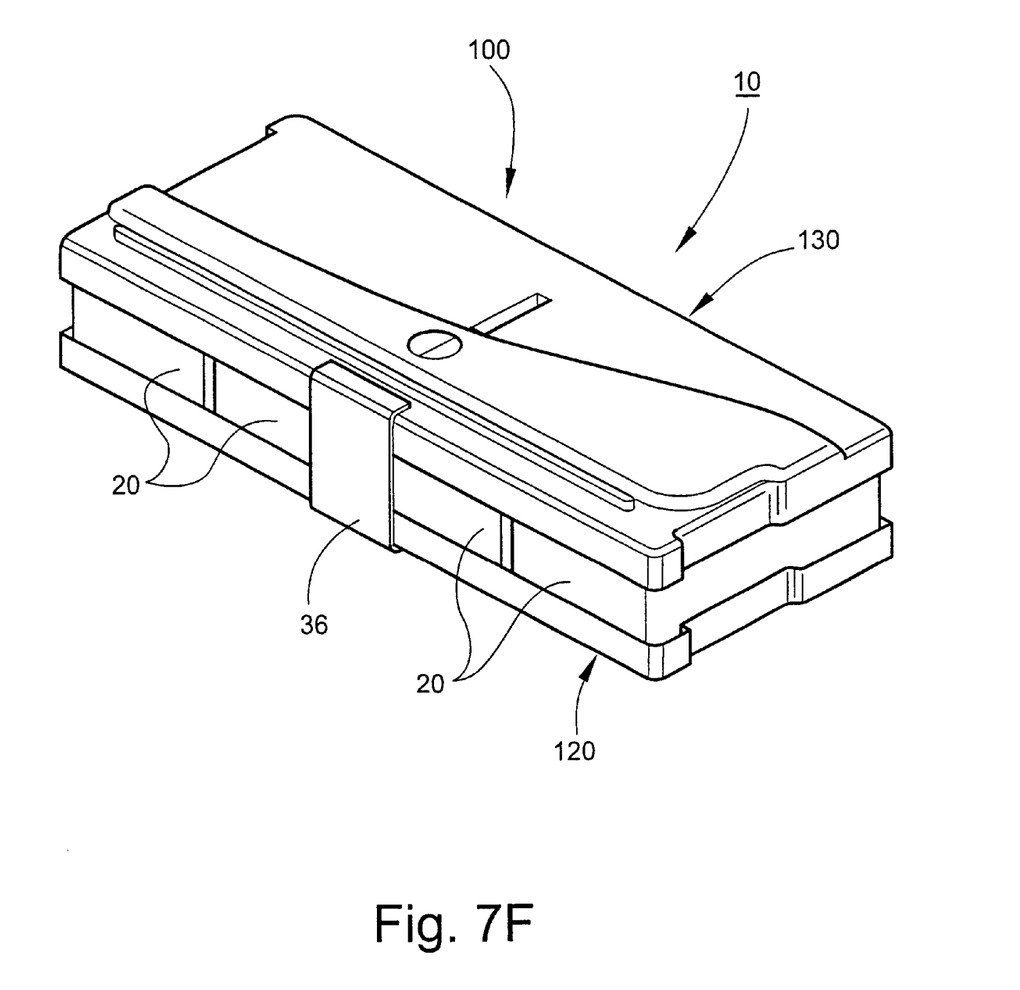

With the shell portions 120, 130 positioned over the batteries 20 as shown in FIGS. 5 and 6, a self-adhesive warning label 36 is applied such that it adheres to each of the shell portions 120 and 130 and extends across the gap G. The warning label 36 may include suitable warning indicia or instructions 36A. Alternatively or additionally, one or more strips of self-adhesive tape 38 (preferably transparent) may be applied in the same manner.

The battery pack 10 may form a part of the battery subsystem 51 as shown in FIG. 8. The battery subsystem 51 includes associated electronics 54 such as a battery converter circuit and/or a battery charger to which the battery pack 10 is operatively electrically connected by the connector 32. The electronics 54 may in turn be connected to other associated electronics 56, 58 such as a rectifier and an inverter whereby the power supply device 50 may serve as a UPS or EBM with the battery pack 10 serving as a back up energy supply. The device 50 (including the battery pack 10 and the electronics 54, 56, 58) may be contained in a housing 52 and supported by a rack 59, for example.

The battery pack 10 may be conveniently removed from the device 50 by grasping and pulling the handle 154. When the handle 154 is not needed (e.g., when the battery pack is installed in the device 50 or in storage) the handle 154 can be folded about a fold line 154B and tucked under the adjacent side wall 134.

With reference to FIG. 9, the apparatus 70 for forming the housing 100 includes a stand 72 from which a sheet or web 74 of the polymeric material is supplied. The web 74 preferably has a substantially uniform thickness which is the same as the thickness T of the housing 100 as discussed above.

The web 74 is drawn through a thermoforming machine 76. Suitable thermoforming machines 76 include in-line thermoformers available from Sencor of Indiana. The thermoforming machine 76 thermoforms the web 74 to form housing blanks 100A. Each of the housing blanks 100A includes the cavities 121, 131, the ribs 126, 136 and the channels 138, 150.

Thereafter, a stamping machine 78 cuts each housing blank 100A from the web 74. The stamping machine 78 may form the hole 152, the opening 154A and the perforations 142A, 143A. Alternatively, all or some of these features may be formed by a separate machine. The housings 100 thus formed may be stacked in a bin 77 and the remainder or waste portion 74A of the web 74 may be taken up on a stand 79.

The battery pack housing 100 and the battery pack 10 provide a number of advantages. The housing 100 may be cost-effectively, accurately and conveniently formed by the aforementioned thermoforming and cutting process. The battery pack 10 may be conveniently assembled from the housing 100, including the installation and arrangement of the batteries 20 and the wires 30. The channel 150 accommodates the wires 30. The hole 152 provides means for venting. Additionally, the gap G between the shell portions 120, 130 facilitates venting of the batteries 20. The monocoque construction of the battery pack 10 is relatively strong. This strength and the provision of the handle 154 allow for convenient transport and handling (including insertion and removal from the device 50) of a plurality of interconnected batteries 20. The hinge wall 140 and the perforations 142A, 143A provide a living hinge so that additional, separate hinge components are not needed. The transparent material of the housing 100 allows viewing of the finished wiring job as well as the various indicia 24 on the batteries 20. The housing 100 serves as a protective membrane for the batteries 20 while also serving to collect corrosive materials that may leak from the batteries 20. As noted above, the housing 100 may be stacked in a relatively tight bundle by incorporating each of the foregoing features in a single, unitarily formed, molded part. The housing 100 allows for ease of handling and use.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A battery pack comprising:
   a) a housing including:
      1) a first shell portion including a first base wall and a plurality of upstanding first side walls extending from said first base wall, said first base wall and said first side walls defining a first cavity;
      2) a second shell portion foldably connected to said first shell portion, said second shell portion including a second base wall and a plurality of upstanding second side walls extending from said second base wall, said second base wall and said second side walls defining a second cavity; and
      3) wherein said first shell portion and said second shell portion are formed of a polymeric material;
   b) at least one battery disposed in said first and second cavities; and
   c) at least one wire operatively connected to said battery;
   d) wherein said wire extends through and out of said housing.

2. The battery pack of claim 1 including a hinge wall having first and second opposed edges foldably adjoining said first and second shell portions, respectively.

3. The battery pack of claim 2 wherein said first shell portion, said second shell portion and said hinge wall are unitarily formed of said polymeric material.

4. The battery pack of claim 3 including a plurality of perforations formed in said hinge wall adjacent at least one of said first and second shell portions to facilitate folding of said first and second shell portions about said hinge wall.

5. A battery pack comprising:
   a) a housing including:
      1) a first shell portion including a first base wall and a plurality of upstanding first side walls extending from said first base wall, said first base wall and said first side walls defining a first cavity;
      2) a second shell portion foldably connected to said first shell portion, said second shell portion including a second base wall and a plurality of upstanding second side walls extending from said second base wall, said second base wall and said second side walls defining a second cavity; and
      3) wherein said first shell portion and said second shell portion are formed of a polymeric material;
   b) at least one battery disposed in said first and second cavities; and
   c) at least one wire operatively connected to said battery
   d) wherein:
      1) said battery is partly surrounded by said first and second shell portions; and
      2) said first and second shell portions define a gap therebetween, said gap extending fully about said housing between said first and second shell portions except where said second shell portion is foldably connected to said first shell portion.

6. A battery pack comprising:
   a) a housing including:
      1) a first shell portion including a first base wall and a plurality of upstanding first side walls extending from said first base wall, said first base wall and said first side walls defining a first cavity;
      2) a second shell portion foldably connected to said first shell portion, said second shell portion including a second base wall and a plurality of upstanding second side walls extending from said second base wall, said second base wall and said second side walls defining a second cavity; and
      3) wherein said first shell portion and said second shell portion are formed of a polymeric material;
   b) at least one battery disposed in said first and second cavities; and
   c) at least one wire operatively connected to said battery;
   d) wherein:
      1) said battery is partly surrounded by said first and second shell portions; and
      2) said first and second shell portions define a gap therebetween; and
      3) said battery pack further includes a self-adhesive warning label adhered to each of said first and second shell portions and extending across said gap.

7. The battery pack of claim 1 further including a wire channel formed in at least one of said first and second shell portions, and wherein said at least one wire extends through said wire channel.

8. The battery pack of claim 1 including a plurality of batteries disposed in said first and second cavities.

9. The battery pack of claim 8 further including:
   a wire channel formed in at least one of said first and second shell portions; and
   a plurality of said wires operatively connected to each of said batteries and extending through said wire channel.

10. The housing of claim 1 wherein said housing is transparent.

11. The housing of claim 1 including a handle integral with said housing and extending from at least one of said first and second side walls.

12. The housing of claim 1 including a vent hole defined in at least one of said first and second base walls.

13. A battery pack comprising:
   a) a unitary, transparent housing formed of a polymeric material, said housing including:
      1) a first shell portion including a first base wall and a plurality of upstanding first side walls extending from said first base wall, said first base wall and said first side walls defining a first cavity;
      2) a second shell portion including a second base wall and a plurality of upstanding second side walls extending from said second base wall, said second base wall and said second side walls defining a second cavity;
      3) a hinge wall having first and second opposed edges adjoining said first and second shell portions, respectively;
      4) a plurality of perforations formed in said hinge wall adjacent at least one of said first and second shell portions to facilitate folding of said first and second shell portions about said hinge wall;
      5) a handle integral with said housing and extending from at least one of said first and second side walls;
      6) a vent hole defined in at least one of said first and second base walls; and
      7) a wire channel formed in at least one of said first and second shell portions; and
   b) a plurality of batteries disposed in said first and second cavities such that said batteries are partly surrounded by said first and second shell portions and said first and second shell portions define a gap therebetween;
   c) a self-adhesive warning label adhered to each of said first and second shell portions and extending across said gap; and
   d) a plurality of wires operatively connected to each of said batteries and extending through said wire channel.

14. A housing for a battery pack, said housing comprising:
   a) a first shell portion including a first base wall and a plurality of upstanding first side walls extending from said first base wall, said first base wall and said first side walls defining a first cavity;
   b) a second shell portion foldably connected to said first shell portion, said second shell portion including a second base wall and a plurality of upstanding second side walls extending from said second base wall, said second base wall and said second side walls defining a second cavity; and
   c) a handle integral with said housing and extending from at least one of said first and second side walls;
   d) wherein said first shell portion, said second shell portion and said hinge wall are formed of a polymeric material.

15. The housing of claim 14 wherein said first shell portion, said second shell portion and said hinge wall are unitarily formed.

16. The housing of claim 15 including a plurality of perforations formed in said hinge wall adjacent at least one of said first and second shell portions to facilitate folding of said first and second shell portions about said hinge wall.

17. The housing of claim 14 wherein said housing is transparent.

18. The housing of claim 14 including a wire channel formed in at least one of said first and second shell portions, said wire channel sized and configured to receive at least one wire.

19. The housing of claim 14 including a vent hole defined in at least one of said first and second base walls.

20. A method for forming a battery pack, said method comprising the steps of:
   a) providing a continuous sheet of polymeric material;
   b) thermoforming a unitary housing in the sheet, the housing including:
      1) a first shell portion including a first base wall and a plurality of upstanding first side walls extending from the first base wall, the first base wall and the first side walls defining a first cavity;
      2) a second shell portion foldably connected to the first shell portion, the second shell portion including a second base wall and a plurality of upstanding second side walls extending from the second base wall, the second base wall and the second side walls defining a second cavity;
   c) removing the housing from a remaining portion of the sheet;
   d) placing a plurality of batteries in the first cavity;
   e) electrically connecting the plurality of batteries with at least one wire; and
   f) folding the second shell portion about the first shell portion such that the battery is received in the second cavity.

21. The method of claim 20 wherein said step of thermoforming the housing includes forming a wire channel in the second shell portion and including the step of placing the at least one wire in the wire channel.

22. The method of claim 20 including the step of applying a self-adhesive label to each of the first and second shell portions and extending between the first and second shell portions.

23. The method of claim 20 wherein the sheet is transparent.

24. The method of claim 20 including the step of forming a handle integral with the housing and extending from at least one of the first and second side walls.

25. The method of claim 20 including the step of forming a vent hole in at least one of the first and second base walls.

26. The method of claim 20 wherein said step of thermoforming includes forming a hinge wall having first and second opposed edges adjoining the first and second shell portions, respectively.

27. The method of claim 26 including the step of forming perforations in the hinge wall adjacent at least one of the first and second shell portions to facilitate folding of the first and second shell portions about the hinge wall.

28. A power supply device comprising:
a) a device case;
b) a power supply circuit mounted in said device case; and
c) a battery pack mounted in said device case, said battery pack comprising:
1) a housing including.
a first shell portion including a first base wall and a plurality of upstanding first side walls extending from said first base wall, said first base wall and said first side walls defining a first cavity; and
a second shell portion foldably connected to said first shell portion, said second shell portion including a second base wall and a plurality of upstanding second side walls extending from said second base wall, said second base wall and said second side walls defining a second cavity;
2) at least one battery disposed in said first and second cavities; and
3) at least one wire operatively connecting said battery to said power supply circuit;
4) wherein said wire extends through and out of said housing.

29. The device of claim 28 wherein said device is at least one of an uninterruptible power system and an extended battery module.

30. The device of claim 28 including a plurality of batteries disposed in said housing cavity.

31. The device of claim 28 wherein said first shell portion and said second shell portion are formed of a polymeric material.

32. The device of claim 31 wherein said battery pack is removable from said device case.

33. The device of claim 31 wherein said device is at least one of an uninterruptible power system and an extended battery module.

* * * * *